US009529984B2

(12) United States Patent
Raichelgauz et al.

(10) Patent No.: US 9,529,984 B2
(45) Date of Patent: Dec. 27, 2016

(54) SYSTEM AND METHOD FOR VERIFICATION OF USER IDENTIFICATION BASED ON MULTIMEDIA CONTENT ELEMENTS

(71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

(21) Appl. No.: 14/043,230

(22) Filed: Oct. 1, 2013

(65) Prior Publication Data

US 2014/0033300 A1 Jan. 30, 2014

Related U.S. Application Data

(63) Continuation-in-part of application No. 13/602,858, filed on Sep. 4, 2012, now Pat. No. 8,868,619, which is
(Continued)

(30) Foreign Application Priority Data

Oct. 26, 2005 (IL) .......................... 171577
Jan. 29, 2006 (IL) .......................... 173409
Aug. 21, 2007 (IL) .......................... 185414

(51) Int. Cl.
*G06F 17/30* (2006.01)
*G06F 21/31* (2013.01)
*H04W 12/06* (2009.01)

(52) U.S. Cl.
CPC ........... *G06F 21/31* (2013.01); *G06F 17/3002* (2013.01); *G06F 17/30017* (2013.01);
(Continued)

(58) Field of Classification Search
CPC .................... G06F 17/30038; G06F 17/30864; G06F 17/30899; G06F 17/3002; G06F 17/30265; G06F 17/30858; G06F 17/30017; G06F 17/30637; G06F 17/30746; G06F 17/30796; G06F 17/30799; G06K 9/00718; G11B 20/0021; G11B 20/00086
See application file for complete search history.

(56) References Cited

U.S. PATENT DOCUMENTS 4,733,353 A 3/1988 Jaswa
4,932,645 A 6/1990 Schorey et al.
(Continued)

FOREIGN PATENT DOCUMENTS

WO 02/31764 4/2002
WO 2007/049282 5/2007

OTHER PUBLICATIONS

Ching-Yung Lin et al., "Robust Digital Signature for Multimedia Authentication: A Summary", IEEE Circuits and Systems Magazine, Fourth Quarter 2003, pp. 23-26.*
(Continued)

*Primary Examiner* — Srirama Channavajjala
(74) *Attorney, Agent, or Firm* — M&B IP Analysts, LLC

(57) ABSTRACT

A method and system for verifying an identity of a user accessing a user device are provided. The method includes receiving a request to verify the user identity accessing the user device; receiving a plurality of multimedia identification signals from the user device; querying a deep-content-classification (DCC) system to find a match between at least one concept structure associated with the user and the plurality of received multimedia identification signals, wherein the concept structure is created during a sign-in procedure; and sending an authentication notification upon
(Continued)

determination of a match between the at least one concept structure and the plurality of received multimedia identification signals.

23 Claims, 9 Drawing Sheets

Related U.S. Application Data a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009.

(52) U.S. Cl.
CPC .... *G06F 17/3074* (2013.01); *G06F 17/30244* (2013.01); *G06F 17/30613* (2013.01); *G06F 17/30619* (2013.01); *G06F 17/30634* (2013.01); *G06F 17/30637* (2013.01); *G06F 17/30705* (2013.01); *G06F 17/30781* (2013.01); *H04W 12/06* (2013.01)

(56) References Cited

U.S. PATENT DOCUMENTS

| | | | |
|---|---|---|---|
| 4,972,363 A | 11/1990 | Nguyen et al. | |
| 5,307,451 A | 4/1994 | Clark | |
| 5,568,181 A | 10/1996 | Greenwood et al. | |
| 5,806,061 A * | 9/1998 | Chaudhuri | G06F 17/30017 |
| 5,852,435 A * | 12/1998 | Vigneaux | G06F 17/30017 |
| | | | 345/428 |
| 5,870,754 A | 2/1999 | Dimitrova et al. | |
| 5,887,193 A | 3/1999 | Takahashi et al. | |
| 5,940,821 A | 8/1999 | Wical | |
| 5,978,754 A | 11/1999 | Kumano | |
| 5,987,454 A | 11/1999 | Hobbs | |
| 6,038,560 A | 3/2000 | Wical | |
| 6,052,481 A | 4/2000 | Grajski et al. | |
| 6,076,088 A | 6/2000 | Paik et al. | |
| 6,122,628 A | 9/2000 | Castelli et al. | |
| 6,137,911 A | 10/2000 | Zhilyaev | |
| 6,144,767 A | 11/2000 | Bottou et al. | |
| 6,147,636 A | 11/2000 | Gershenson | |
| 6,240,423 B1 | 5/2001 | Hirata | |
| 6,243,375 B1 | 6/2001 | Speicher | |
| 6,329,986 B1 | 12/2001 | Cheng | |
| 6,363,373 B1 | 3/2002 | Steinkraus | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,493,692 B1 | 12/2002 | Kobayashi et al. | |
| 6,493,705 B1 | 12/2002 | Kobayashi et al. | |
| 6,523,022 B1 | 2/2003 | Hobbs | |
| 6,523,046 B2 | 2/2003 | Liu et al. | |
| 6,524,861 B1 | 2/2003 | Anderson | |
| 6,526,400 B1 | 2/2003 | Takata et al. | |
| 6,550,018 B1 | 4/2003 | Abonamah et al. | |
| 6,560,597 B1 | 5/2003 | Dhillon et al. | |
| 6,594,699 B1 * | 7/2003 | Sahai | H04L 29/06027 |
| | | | 709/228 |
| 6,601,060 B1 | 7/2003 | Tomaru | |
| 6,611,628 B1 | 8/2003 | Sekiguchi et al. | |
| 6,611,837 B2 | 8/2003 | Schreiber | |
| 6,618,711 B1 | 9/2003 | Ananth | |
| 6,643,620 B1 | 11/2003 | Contolini et al. | |
| 6,643,643 B1 | 11/2003 | Lee et al. | |
| 6,675,159 B1 | 1/2004 | Lin et al. | |
| 6,728,706 B2 | 4/2004 | Aggarwal et al. | |
| 6,732,149 B1 | 5/2004 | Kephart | |
| 6,751,363 B1 | 6/2004 | Natsev et al. | |
| 6,754,435 B2 | 6/2004 | Kim | |
| 6,763,519 B1 | 7/2004 | McColl et al. | |
| 6,774,917 B1 | 8/2004 | Foote et al. | |
| 6,804,356 B1 | 10/2004 | Krishnamachari | |
| 6,819,797 B1 | 11/2004 | Smith et al. | |
| 6,836,776 B2 | 12/2004 | Schreiber | |
| 6,845,374 B1 | 1/2005 | Oliver et al. | |
| 6,901,207 B1 | 5/2005 | Watkins | |
| 6,938,025 B1 | 8/2005 | Lulich et al. | |
| 6,970,881 B1 | 11/2005 | Mohan et al. | |
| 6,978,264 B2 | 12/2005 | Chandrasekar et al. | |
| 7,006,689 B2 | 2/2006 | Kasutani | |
| 7,013,051 B2 | 3/2006 | Sekiguchi et al. | |
| 7,043,473 B1 | 5/2006 | Rassool et al. | |
| 7,124,149 B2 | 10/2006 | Smith et al. | |
| 7,199,798 B1 | 4/2007 | Echigo et al. | |
| 7,260,564 B1 | 8/2007 | Lynn et al. | |
| 7,277,928 B2 | 10/2007 | Lennon | |
| 7,296,012 B2 | 11/2007 | Ohashi | |
| 7,302,117 B2 | 11/2007 | Sekiguchi et al. | |
| 7,313,805 B1 | 12/2007 | Rosin et al. | |
| 7,346,629 B2 | 3/2008 | Kapur et al. | |
| 7,392,238 B1 | 6/2008 | Zhou et al. | |
| 7,406,459 B2 | 7/2008 | Chen et al. | |
| 7,450,740 B2 | 11/2008 | Shah et al. | |
| 7,523,102 B2 | 4/2009 | Bjarnestam et al. | |
| 7,526,607 B1 | 4/2009 | Singh et al. | |
| 7,536,384 B2 | 5/2009 | Venkataraman et al. | |
| 7,542,969 B1 | 6/2009 | Rappaport et al. | |
| 7,548,910 B1 | 6/2009 | Chu et al. | |
| 7,555,477 B2 | 6/2009 | Bayley et al. | |
| 7,555,478 B2 | 6/2009 | Bayley et al. | |
| 7,562,076 B2 | 7/2009 | Kapur | |
| 7,574,436 B2 | 8/2009 | Kapur et al. | |
| 7,574,668 B2 | 8/2009 | Nunez et al. | |
| 7,577,656 B2 | 8/2009 | Kawai et al. | |
| 7,694,318 B2 | 4/2010 | Eldering et al. | |
| 7,836,054 B2 | 11/2010 | Kawai et al. | |
| 7,920,894 B2 | 4/2011 | Wyler | |
| 7,921,107 B2 | 4/2011 | Chang et al. | |
| 7,974,994 B2 | 7/2011 | Li et al. | |
| 7,987,194 B1 | 7/2011 | Walker et al. | |
| 7,987,217 B2 | 7/2011 | Long et al. | |
| 7,991,715 B2 | 8/2011 | Schiff et al. | |
| 8,000,655 B2 | 8/2011 | Wang et al. | |
| 8,036,893 B2 | 10/2011 | Reich | |
| 8,098,934 B2 | 1/2012 | Vincent et al. | |
| 8,266,185 B2 | 9/2012 | Raichelgauz et al. | |
| 8,312,031 B2 | 11/2012 | Raichelgauz et al. | |
| 8,316,005 B2 | 11/2012 | Moore | |
| 8,326,775 B2 * | 12/2012 | Raichelgauz | G06F 17/30595 |
| | | | 706/10 |
| 8,352,745 B2 | 1/2013 | McKeeth | |
| 8,655,801 B2 * | 2/2014 | Raichelgauz | G06N 3/063 |
| | | | 706/12 |
| 8,677,377 B2 | 3/2014 | Cheyer et al. | |

(56) References Cited

U.S. PATENT DOCUMENTS

| | | | |
|---|---|---|---|
| 8,682,667 B2 | 3/2014 | Haughay | |
| 8,688,446 B2 | 4/2014 | Yanagihara | |
| 8,706,503 B2 | 4/2014 | Cheyer et al. | |
| 8,775,442 B2 | 7/2014 | Moore et al. | |
| 8,868,619 B2 | 10/2014 | Raichelgauz et al. | |
| 8,880,539 B2 | 11/2014 | Raichelgauz et al. | |
| 8,880,566 B2 | 11/2014 | Raichelgauz et al. | |
| 8,898,568 B2 | 11/2014 | Bull et al. | |
| 8,922,414 B2 | 12/2014 | Raichelgauz et al. | |
| 8,959,037 B2 | 2/2015 | Raichelgauz et al. | |
| 8,990,125 B2 | 3/2015 | Raichelgauz et al. | |
| 9,009,086 B2 | 4/2015 | Raichelgauz et al. | |
| 9,031,999 B2 | 5/2015 | Raichelgauz et al. | |
| 9,087,049 B2 | 7/2015 | Raichelgauz et al. | |
| 9,104,747 B2 | 8/2015 | Raichelgauz et al. | |
| 9,191,626 B2 | 11/2015 | Raichelgauz et al. | |
| 9,197,244 B2 | 11/2015 | Raichelgauz et al. | |
| 9,218,606 B2 | 12/2015 | Raichelgauz et al. | |
| 9,235,557 B2 | 1/2016 | Raichelgauz et al. | |
| 9,256,668 B2 | 2/2016 | Raichelgauz et al. | |
| 9,330,189 B2 | 5/2016 | Raichelgauz et al. | |
| 9,438,270 B2 | 9/2016 | Raichelgauz et al. | |
| 2001/0019633 A1 | 9/2001 | Tenze et al. | |
| 2001/0056427 A1 | 12/2001 | Yoon et al. | |
| 2002/0019881 A1 | 2/2002 | Bokhari et al. | |
| 2002/0059580 A1 | 5/2002 | Kalker et al. | |
| 2002/0087530 A1 | 7/2002 | Smith et al. | |
| 2002/0107827 A1* | 8/2002 | Benitez-Jimenez | G06F 17/30017 706/59 |
| 2002/0123928 A1 | 9/2002 | Eldering et al. | |
| 2002/0126872 A1* | 9/2002 | Brunk | G06K 9/00744 382/100 |
| 2002/0129296 A1 | 9/2002 | Kwiat et al. | |
| 2002/0143976 A1 | 10/2002 | Barker et al. | |
| 2002/0157116 A1 | 10/2002 | Jasinschi | |
| 2002/0163532 A1 | 11/2002 | Thomas et al. | |
| 2002/0174095 A1 | 11/2002 | Lulich et al. | |
| 2002/0178410 A1 | 11/2002 | Haitsma et al. | |
| 2003/0028660 A1 | 2/2003 | Igawa et al. | |
| 2003/0041047 A1 | 2/2003 | Chang et al. | |
| 2003/0078766 A1 | 4/2003 | Appelt et al. | |
| 2003/0086627 A1* | 5/2003 | Berriss | G06F 17/3025 382/305 |
| 2003/0126147 A1 | 7/2003 | Essafi et al. | |
| 2003/0182567 A1 | 9/2003 | Barton et al. | |
| 2003/0191764 A1 | 10/2003 | Richards | |
| 2003/0200217 A1* | 10/2003 | Ackerman | G06F 21/32 |
| 2004/0003394 A1 | 1/2004 | Ramaswamy | |
| 2004/0025180 A1* | 2/2004 | Begeja | G06F 17/30017 725/46 |
| 2004/0068510 A1 | 4/2004 | Hayes et al. | |
| 2004/0107181 A1 | 6/2004 | Rodden | |
| 2004/0111465 A1 | 6/2004 | Chuang et al. | |
| 2004/0117367 A1* | 6/2004 | Smith | G06F 17/30265 |
| 2004/0128142 A1 | 7/2004 | Whitham | |
| 2004/0128511 A1* | 7/2004 | Sun | H04L 9/3247 713/176 |
| 2004/0133927 A1 | 7/2004 | Sternberg et al. | |
| 2004/0153426 A1 | 8/2004 | Nugent | |
| 2004/0215663 A1 | 10/2004 | Liu et al. | |
| 2004/0249779 A1 | 12/2004 | Nauck et al. | |
| 2004/0260688 A1* | 12/2004 | Gross | G06F 17/30867 |
| 2005/0144455 A1 | 6/2005 | Haitsma | |
| 2005/0177372 A1 | 8/2005 | Wang et al. | |
| 2005/0238238 A1 | 10/2005 | Xu et al. | |
| 2005/0281439 A1 | 12/2005 | Lange | |
| 2006/0004745 A1 | 1/2006 | Kuhn et al. | |
| 2006/0013451 A1 | 1/2006 | Haitsma | |
| 2006/0020860 A1 | 1/2006 | Tardif et al. | |
| 2006/0020958 A1 | 1/2006 | Allamanche et al. | |
| 2006/0026203 A1 | 2/2006 | Tan et al. | |
| 2006/0031216 A1 | 2/2006 | Semple et al. | |
| 2006/0041596 A1 | 2/2006 | Stirbu et al. | |
| 2006/0048191 A1 | 3/2006 | Xiong | |
| 2006/0064037 A1 | 3/2006 | Shalon et al. | |
| 2006/0112035 A1 | 5/2006 | Cecchi et al. | |
| 2006/0143674 A1 | 6/2006 | Jones et al. | |
| 2006/0153296 A1 | 7/2006 | Deng | |
| 2006/0159442 A1 | 7/2006 | Kim et al. | |
| 2006/0173688 A1 | 8/2006 | Whitham | |
| 2006/0184638 A1 | 8/2006 | Chua et al. | |
| 2006/0204035 A1 | 9/2006 | Guo et al. | |
| 2006/0217818 A1 | 9/2006 | Fujiwara | |
| 2006/0224529 A1 | 10/2006 | Kermani | |
| 2006/0236343 A1 | 10/2006 | Chang | |
| 2006/0242139 A1 | 10/2006 | Butterfield et al. | |
| 2006/0242554 A1 | 10/2006 | Gerace et al. | |
| 2006/0248558 A1 | 11/2006 | Barton et al. | |
| 2006/0253423 A1 | 11/2006 | McLane et al. | |
| 2007/0009159 A1 | 1/2007 | Fan | |
| 2007/0011151 A1 | 1/2007 | Hagar et al. | |
| 2007/0038608 A1 | 2/2007 | Chen | |
| 2007/0042757 A1 | 2/2007 | Jung et al. | |
| 2007/0067304 A1 | 3/2007 | Ives | |
| 2007/0067682 A1 | 3/2007 | Fang | |
| 2007/0071330 A1 | 3/2007 | Oostveen et al. | |
| 2007/0074147 A1 | 3/2007 | Wold | |
| 2007/0091106 A1 | 4/2007 | Moroney | |
| 2007/0130112 A1 | 6/2007 | Lin | |
| 2007/0130159 A1 | 6/2007 | Gulli et al. | |
| 2007/0168413 A1 | 7/2007 | Barletta et al. | |
| 2007/0174320 A1 | 7/2007 | Chou | |
| 2007/0195987 A1 | 8/2007 | Rhoads | |
| 2007/0220573 A1* | 9/2007 | Chiussi | H04L 12/189 725/114 |
| 2007/0244902 A1 | 10/2007 | Seide et al. | |
| 2007/0253594 A1 | 11/2007 | Lu et al. | |
| 2007/0255785 A1 | 11/2007 | Hayashi et al. | |
| 2007/0268309 A1 | 11/2007 | Tanigawa et al. | |
| 2007/0282826 A1 | 12/2007 | Hoeber et al. | |
| 2007/0294295 A1 | 12/2007 | Finkelstein et al. | |
| 2008/0046406 A1 | 2/2008 | Seide et al. | |
| 2008/0049629 A1 | 2/2008 | Morrill | |
| 2008/0072256 A1 | 3/2008 | Boicey et al. | |
| 2008/0091527 A1 | 4/2008 | Silverbrook et al. | |
| 2008/0163288 A1 | 7/2008 | Ghosal et al. | |
| 2008/0165861 A1 | 7/2008 | Wen et al. | |
| 2008/0172615 A1 | 7/2008 | Igelman et al. | |
| 2008/0201299 A1 | 8/2008 | Lehikoinen et al. | |
| 2008/0204706 A1 | 8/2008 | Magne et al. | |
| 2008/0253737 A1 | 10/2008 | Kimura et al. | |
| 2008/0270373 A1 | 10/2008 | Oostveen et al. | |
| 2008/0313140 A1 | 12/2008 | Pereira et al. | |
| 2009/0013414 A1 | 1/2009 | Washington et al. | |
| 2009/0037408 A1 | 2/2009 | Rodgers | |
| 2009/0089587 A1* | 4/2009 | Brunk | G06K 9/00744 713/176 |
| 2009/0119157 A1 | 5/2009 | Dulepet | |
| 2009/0148045 A1 | 6/2009 | Lee et al. | |
| 2009/0157575 A1 | 6/2009 | Schobben et al. | |
| 2009/0172030 A1* | 7/2009 | Schiff | G06Q 30/02 |
| 2009/0175538 A1 | 7/2009 | Bronstein et al. | |
| 2009/0245573 A1 | 10/2009 | Saptharishi et al. | |
| 2009/0245603 A1 | 10/2009 | Koruga et al. | |
| 2009/0253583 A1 | 10/2009 | Yoganathan | |
| 2009/0277322 A1 | 11/2009 | Cai et al. | |
| 2010/0042646 A1 | 2/2010 | Raichelgauz et al. | |
| 2010/0082684 A1 | 4/2010 | Churchill et al. | |
| 2010/0104184 A1 | 4/2010 | Bronstein et al. | |
| 2010/0125569 A1 | 5/2010 | Nair et al. | |
| 2010/0162405 A1 | 6/2010 | Cook et al. | |
| 2010/0173269 A1 | 7/2010 | Puri et al. | |
| 2010/0268524 A1 | 10/2010 | Nath et al. | |
| 2010/0306193 A1 | 12/2010 | Pereira et al. | |
| 2010/0318493 A1 | 12/2010 | Wessling | |
| 2010/0322522 A1 | 12/2010 | Wang et al. | |
| 2011/0052063 A1 | 3/2011 | McAuley et al. | |
| 2011/0055585 A1 | 3/2011 | Lee | |
| 2011/0145068 A1 | 6/2011 | King et al. | |
| 2011/0202848 A1 | 8/2011 | Ismalon | |
| 2011/0246566 A1 | 10/2011 | Kashef et al. | |
| 2011/0251896 A1 | 10/2011 | Impollonia et al. | |
| 2011/0313856 A1 | 12/2011 | Cohen et al. | |

(56) References Cited

U.S. PATENT DOCUMENTS

| | | |
|---|---|---|
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0104251 A1 | 4/2013 | Moore et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2015/0289022 A1 | 10/2015 | Gross |

OTHER PUBLICATIONS

Foote, Jonathan, et al. "Content-Based Retrieval of Music and Audio", 1997 Institute of Systems Science, National University of Singapore, Singapore (ABSTRACT).

Ribert et al. "An Incremental Hierarchical Clustering", Visicon Interface 1999, pp. 586-591.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

IPO Examination Report under Section 18(3) for corresponding UK application No. GB1001219.3, dated Sep. 12, 2011.

International Search Report for the corresponding International Patent Application PCT/IL2006/001235; Date of Mailing: Nov. 2, 2008.

International Search Authority: "Written Opinion of the International Searching Authority" (PCT Rule 43bis.1) including International Search Report for International Patent Application No. PCT/US2008/073852; Date of Mailing: Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Boari et al, "Adaptive Routing for Dynamic Applications in Massively Parallel Architectures", 1995 IEEE, Spring 1995.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Garcia, "Solving the Weighted Region Least Cost Path Problem Using Transputers", Naval Postgraduate School, Monterey, California, Dec. 1989.

Mandhaoui, et al, "Emotional Speech Characterization Based on Multi-Features Fusion for Face-to-Face Interaction", Universite Pierre et Marie Curie, Paris, France, 2009.

(56) References Cited

OTHER PUBLICATIONS

Marti, et al, "Real Time Speaker Localization and Detection System for Camera Steering in Multiparticipant Videoconferencing Environments", Universidad Politecnica de Valencia, Spain, 2011.

Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Theodoropoulos et al, "Simulating Asynchronous Architectures on Transputer Networks", Proceedings of the Fourth Euromicro Workshop on Parallel and Distributed Processing, 1996. PDP '96.

Liu, et al., "Instant Mobile Video Search With Layered Audio-Video Indexing and Progressive Transmission", Multimedia, IEEE Transactions on Year 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109 1TELFOR.2012.6419494 IEEE Conference Publications.

Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.

Wang et al. "A Signature for Content-based Image Retrieval Using a Geometrical Transform", ACM 1998, pp. 229-234.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Gomes et al., "Audio Watermaking and Fingerprinting: For Which Applications?" University of Rene Descartes, Paris, France, 2003.

Nam, et al., "Audio Visual Content-Based Violent Scene Characterization", Department of Electrical and Computer Engineering, Minneapolis, MN, 1998, pp. 353-357.

Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ ICASSP.2009.4960375, IEEE Conference Publications, Arizona.

May et al., "The Transputer", Springer-Verlag, Berlin Heidelberg, 1989, teaches multiprocessing system.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.11091 MMSP.2012.6343465, Czech Republic.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Brecheisen, et al., "Hierarchical Genre Classification for Large Music Collections", ICME 2006, pp. 1385-1388.

Chuan-Yu Cho, et al., "Efficient Motion-Vector-Based Video Search Using Query by Clip", 2004, IEEE, Taiwan, pp. 1-4.

Ihab Al Kabary, et al., "SportSense: Using Motion Queries to Find Scenes in Sports Videos", Oct. 2013, ACM, Switzerland, pp. 1-3.

Jianping Fan et al., "Concept-Oriented Indexing of Video Databases: Towards Semantic Sensitive Retrieval and Browsing", IEEE, vol. 13, No. 7, Jul. 2004, pp. 1-19.

Shih-Fu Chang, et al., "VideoQ: A Fully Automated Video Retrieval System Using Motion Sketches", 1998, IEEE New York, pp. 1-2.

Wei-Te Li et al., "Exploring Visual and Motion Saliency for Automatic Video Object Extraction", IEEE, vol. 22, No. 7, Jul. 2013, pp. 1-11.

\* cited by examiner

SYSTEM AND METHOD FOR VERIFICATION OF USER IDENTIFICATION BASED ON MULTIMEDIA CONTENT ELEMENTS

CROSS-REFERENCE TO RELATED APPLICATIONS

This application is a continuation-in-part (CIP) application of U.S. patent application Ser. No. 13/602,858 filed Sep. 4, 2012, now U.S. Pat. No. 8,868,619 which is a continuation of U.S. patent application Ser. No. 12/603,123, filed on Oct. 21, 2009, now issued as U.S. Pat. No. 8,266,185, which is a continuation-in-part of:

(1) U.S. patent application Ser. No. 12/084,150 having a filing date of Apr. 7, 2009, now granted as U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now issued as U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150, now U.S. Pat. No. 8,655,801;

(3) U.S. patent application Ser. No. 12/348,888, filed Jan. 5, 2009, now pending, which is a CIP of U.S. patent application Ser. No. 12/084,150, now U.S. Pat. No. 8,655,801, having a filing date of Apr. 7, 2009 and U.S. patent application Ser. No. 12/195,863 filed on Aug. 21, 2008, now U.S. Pat. No. 8,326,775; and (4) U.S. patent application Ser. No. 12/538,495, filed Aug. 10, 2009, now issued as U.S. Pat. No. 8,312,031, which is a CIP of U.S. patent application Ser. No. 12/084,150 having a filing date of Apr. 7, 2009, now U.S. Pat. No. 8,655,801, U.S. patent application Ser. No. 12/195,863, filed on Aug. 21, 2008, now U.S. Pat. No. 8,326,775; and U.S. patent application Ser. No. 12/348,888, filed Jan. 5, 2009. All of the applications referenced above are herein incorporated by reference.

TECHNICAL FIELD

The present invention relates generally to the analysis of multimedia content elements, and more specifically to a system for verifying user identification based on an analysis of multimedia content elements.

BACKGROUND

The last decade has seen rapid growth in the number of mobile devices and their uses. Mobile devices include, but are not limited to, cellular phones, smart phones, tablet computers, and the like. However, as a result of their popularity and functionality, mobile devices have become a burgeoning target for theft. In addition, mobile devices are typically used to store private and/or confidential information. Such mobile devices are typically installed with applications (e.g. emails, etc.) that provide an access to or contain private and/or confidential information. Consequently, mobile devices have become more sensitive and valuable. Thus, security measures are usually required to verify the identity of the user before allowing access to the mobile devices.

Several applications for securing the access to the mobile devices are currently available. Unfortunately, such applications are static by nature and are usually configured to authenticate the user identification based on only one, or in some cases two parameters, i.e., fingerprint, voice recognition or eye scan, and so on. The use of a passcode alone has become a less reliable means to authenticate the user. This is due to a computer hacker's ability to locate, copy, or electronically identify or track the required password, using specialized software programs. Alternative prior art solutions allow verification of the user identity based on implicit inputs entered by a user of the device for the purpose of authentication, which are then verified by the device's operating system. Such inputs include a password, a passcode, or a fingerprint identifier. The passcode may be in a sequence of digits or a geometric shape drawn by the user on the device's display.

Nevertheless, the use of a password or passcode is a less secure means to verify the user identity because a passcode can be tracked, locked, or discovered using malicious software programs, and further, some users simply do not keep their password protected. The use of a fingerprint has also not proven to provide a reliable method to verify a user, as fingerprints can be easily duplicated or simulated to hack to the mobile device.

Therefore, it would be advantageous to provide a solution that overcomes the deficiencies for verifying the user identity for at least providing an access to at least the user's mobile device.

SUMMARY

Certain embodiments disclosed herein include a system and for method for verifying an identity of a user accessing a user device. The method comprises receiving a request to verify the user identity accessing the user device; receiving a plurality of multimedia identification signals from the user device; querying a deep-content-classification (DCC) system to find a match between at least one concept structure associated with the user and the plurality of received multimedia identification signals, wherein the concept structure is created during a sign-in procedure; and sending an authentication notification upon determination of a match between the at least one concept structure and the plurality of received multimedia identification signals.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
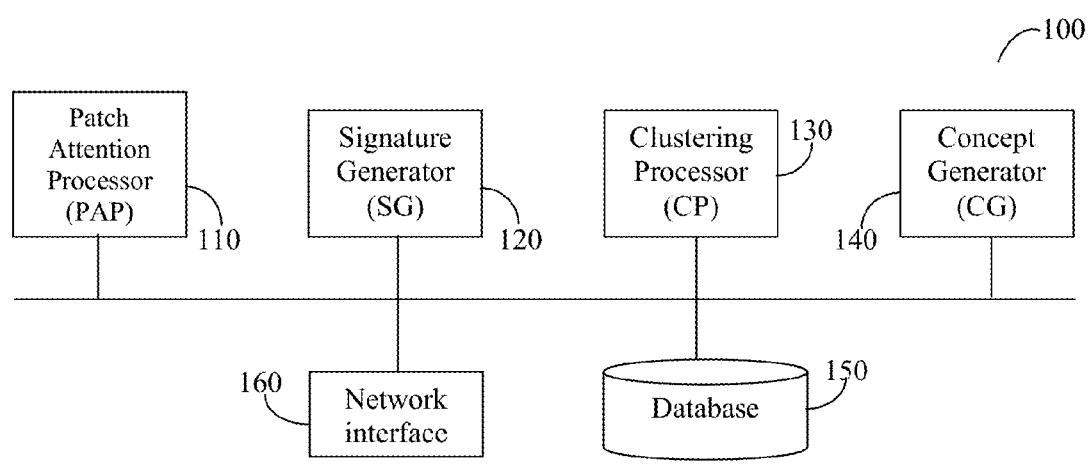
FIG. 1 is a diagram of a DCC system for creating concept structures.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a DCC system 100 for creating concept structures. The DCC system 100 is configured to receive multimedia data elements (MMDEs), for example from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, and infrared signals.

The MMDEs may be stored in a database (DB) 150 or kept in the DB 150 for future retrieval of the respective multimedia data element. Such a reference may be, but is not limited to, a universal resource locator (URL). Every MMDE in the DB 150, or referenced therefrom, is then processed by a patch attention processor (PAP) 110 resulting in a plurality of patches that are of specific interest, or otherwise of higher interest than other patches. A more general pattern extraction, such as an attention processor (AP) may also be used in lieu of patches. The AP receives the MMDE that is partitioned into items; an item may be an extracted pattern or a patch, or any other applicable partition depending on the type of the MMDE. The functions of the PAP 110 are described herein below in more detail.

Those patches that are of higher interest are then used by a signature generator (SG) 120 to generate signatures respective of the patch. The operation of the signature generator (SG) 120 is described in more detail herein below. A clustering process (CP) 130 initiates a process of inter-matching of the signatures once it determines that there are a number of patches that are above a predefined threshold. The threshold may be defined to be large enough to enable proper and meaningful clustering. With a plurality of clusters a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure comprises a plurality of metadata associated with the reduced clusters. The result is a compact representation of a concept that can now be easily compared against a MMDE to determine if the received MMDE matches a concept structure stored, for example in the DB 150, by the CG 140. This can be done, for example and without limitation, by providing a query to the DCC system 100 for finding a match between a concept structure and a MMDE. A more detailed description of the operation of the CG 140 is provided herein below.

It should be appreciated that the DCC system 100 can generate a number of concept structures significantly smaller than the number of MMDEs. For example, if one billion ($10^9$) MMDEs need to be checked for a match against another one billion MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that have had to be made by other solutions. As the number of concept structures grows significantly slower than the number of MMDEs, the advantages of the DCC system 100 would be apparent to one with ordinary skill in the art.

The operation of the PAP 110 will now be provided in greater detail with respect to an image as the MMDE. However, this should not be understood as to limit the scope of the invention; other types of MMDEs are specifically included herein and may be handled by the PAP 110.

Figure 2:
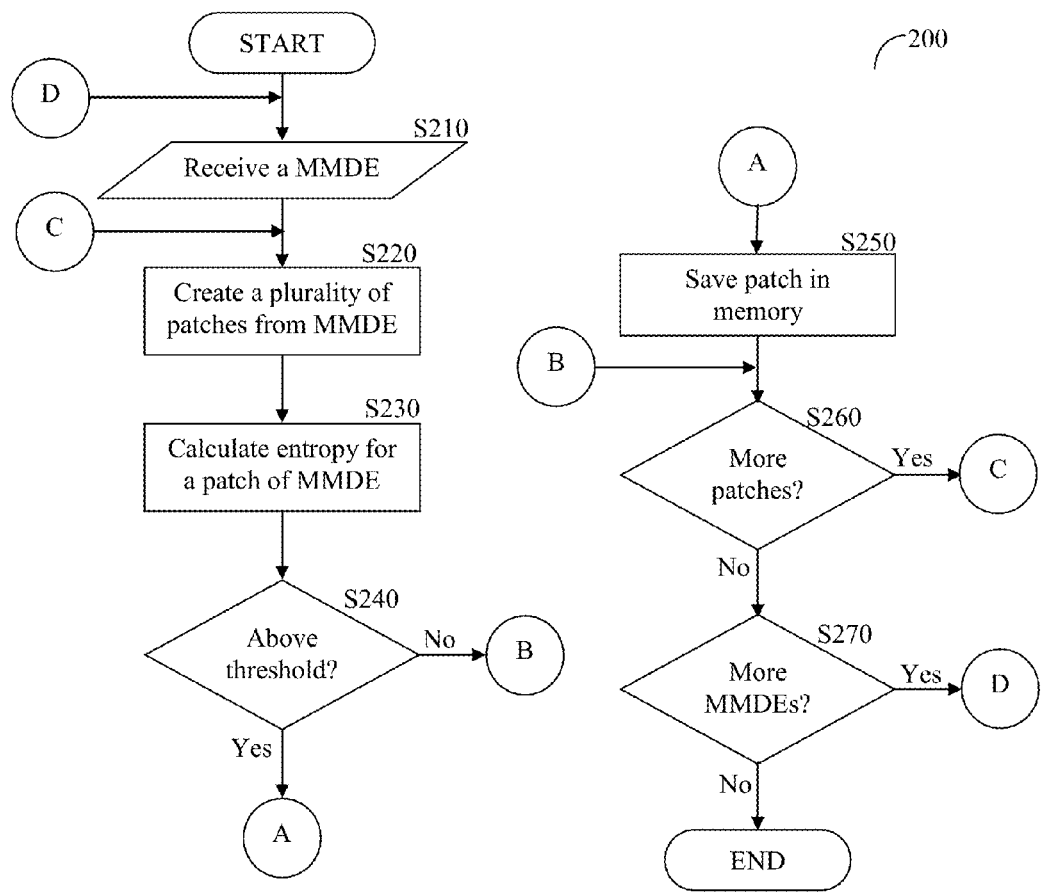
FIG. 2 is a flowchart illustrating the operation of the patch attention processor of the DCC system.

FIG. 2 depicts an exemplary and non-limiting flowchart 200 of the operation of the PAP 110. In S210 the PAP 110 receives a MMDE from a source for such MMDEs. Such a source may be a system that feeds the DCC system 100 with MMDEs, or other sources for MMDEs, for example the world-wide-web (WWW). In S220 the PAP 110 creates a plurality of patches from the MMDE. A patch of an image is defined by, for example, its size, scale, location and orientation. A patch may be, for example and without limitation, a portion of an image of a size 20 pixels by 20 pixels of an image that is 1,000 pixels by 500 pixels. In the case of audio, a patch may be a segment of audio 0.5 seconds in length from a 5 minute audio clip. In S230 a patch not previously checked is processed to determine its entropy. The entropy is a measure of the amount of interesting information that may be present in the patch. For example, a continuous color of the patch has little interest while sharp edges, corners or borders, will result in higher entropy representing a lot of interesting information. The plurality of statistically independent cores, the operation of which is discussed in more detail herein below, is used to determine the level-of-interest of the image and a process of voting takes place to determine whether the patch is of interest or not.

In S240, it is checked whether the entropy was determined to be above a predefined threshold, and if so execution continues with S250; otherwise, execution continues with S260. In S250 the patch having entropy above the threshold is stored for future use by the SG 120 in, for example, DB 150. In S260 it is checked whether there are more patches of the MMDE to be checked, and if so execution continues with S220; otherwise execution continues with S270. In S270 it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than areas that are less meaningful for the formation of a concept structure.

Figure 3:
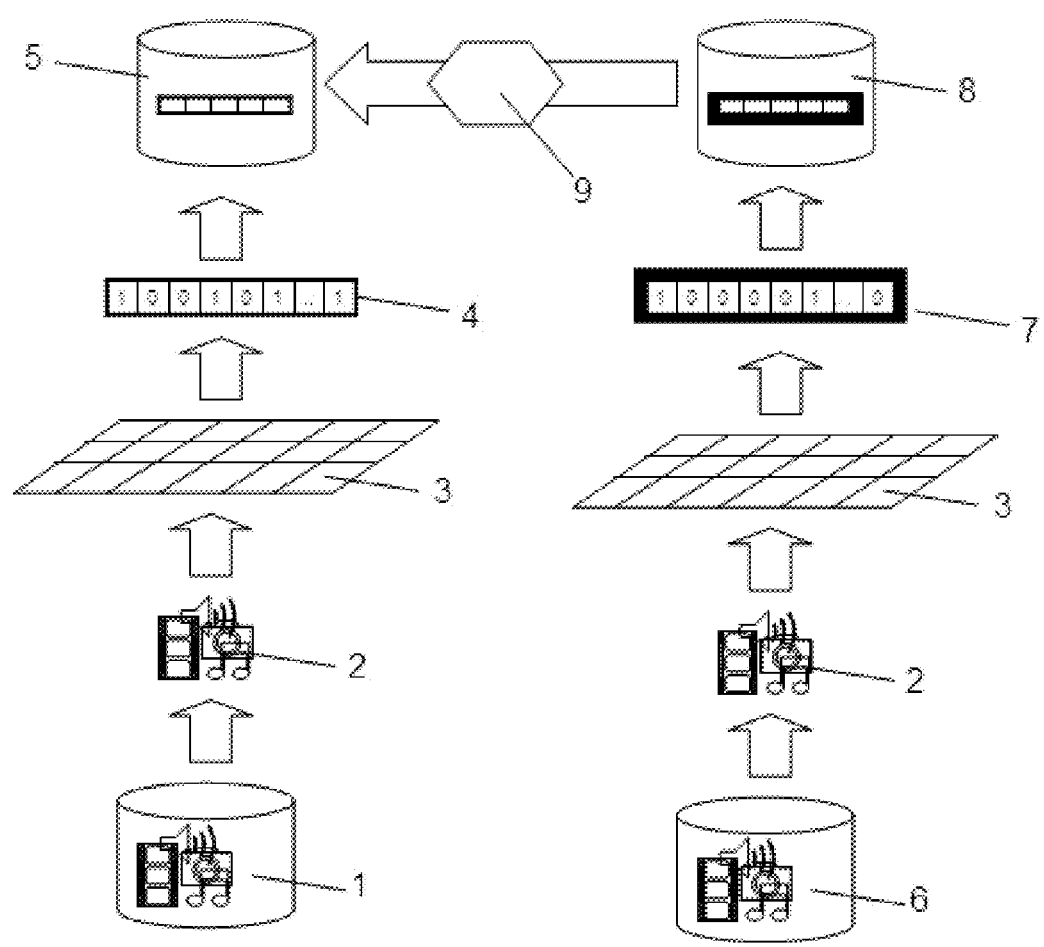
FIG. 3 is a block diagram depicting the basic flow of information in a large-scale video matching system.

A high-level description of the process for large scale video matching performed by the Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the SG 120 is therefore provided, this time with respect to a MMDE which is a sound clip. However, this should not be understood as to limit the scope of the invention and other types of MMDEs are specifically included herein and may be handled by SG 120. To demonstrate an example of signature generation process, it is assumed, merely for the sake of simplicity and without limitation on the generality of the disclosed embodiments, that the signatures are based on a single frame, leading to certain simplification of the computational core's generation. The Matching System shown in FIG. 3 is extensible for signatures generation capturing the dynamics in-between the frames and the information of the frame's patches.

Figure 4:
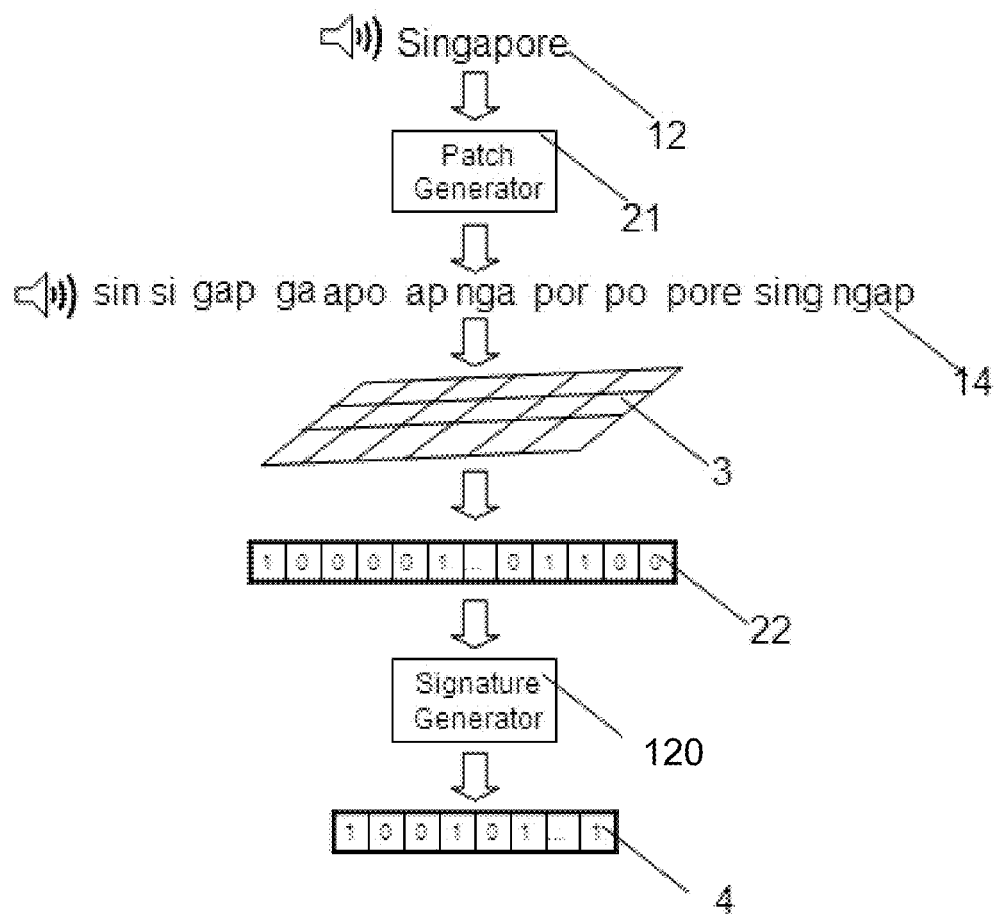
FIG. 4 is a diagram showing the flow of patches generation, response vector generation, and signature generation in a large-scale speech-to-text system.

The signatures generation process will be described with reference to FIG. 4. The first step in the process of signatures generation from a given speech-segment is to break-down the speech-segment to K patches 14 of random length P and random position within the speech segment 12. The breakdown is performed by the patch generator component 21. The value of K is determined based on optimization, considering the tradeoff between accuracy rate and the number of fast matches required in the flow process of the Matching System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$n_i = \Box(V_i - Th_x)$; $\Box$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $C_i$, is a Coupling Node Value.

The Threshold values $Th_x$ are set differently for Signature generation and for Robust Signature generation. For example, for a certain distribution of $V_i$, values (for the set of nodes), the thresholds for Signature ($Th_S$) and Robust Signature ($Th_{RS}$) are set apart, after optimization, according to at least one or more of the following criteria:

For: $V_i > Th_{RS}$ $$1 - p(V > Th_S) - 1 - (1-\epsilon)^l \ll 1 \qquad \text{I}$$

i.e., given that I nodes (cores) constitute a Robust Signature of a certain image I, the probability that not all of these I nodes will belong to the Signature of same, but noisy image, is sufficiently low (according to a system's specified accuracy).

$$p(V_i > Th_{RS}) \approx l/L \qquad \text{II}$$

i.e., approximately l out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. The detailed description of the Signature generation can be found U.S. Pat. Nos. 8,326,775 and 8,312,031, assigned to common assignee, which are hereby incorporated by reference for all the useful information they contain.

Computational Core generation is a process of definition, selection and tuning of the Architecture parameters for a certain realization in a specific system and application. The process is based on several design considerations, such as: (a) The Cores should be designed so as to obtain maximal independence, i.e., the projection from a signal space should generate a maximal pair-wise distance between any two Cores' projections into a high-dimensional space; (b) The Cores should be optimally designed for the type of signals, i.e., the Cores should be maximally sensitive to the spatio-temporal structure of the injected signal, for example, and in particular, sensitive to local correlations in time and space. Thus, in some cases a Core represents a dynamic system, such as in state space, phase space, edge of chaos, etc., which is uniquely used herein to exploit their maximal computational power, and, (c) The Cores should be optimally designed with regard to invariance to a set of signal distortions, of interest in relevant applications. Detailed description of the Computational Core generation, the computational architecture, and the process for configuring such cores is discussed in more detail in the co-pending U.S. patent application Ser. No. 12/084,150 referenced above.

Hence, signatures are generated by the SG 120 responsive of patches received either from the PAP 110, or retrieved from the DB 150, as discussed hereinabove. It should be noted that other ways for generating signatures may also be used for the purpose the DCC system 100. Furthermore, as noted above, the array of computational cores may be used by the PAP 110 for the purpose of determining if a patch has an entropy level that is of interest for signature generation according to the principles of the invention. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 Application"), and which is hereby incorporated for all that it contains. In accordance with an embodiment an inter-match process and clustering thereof is utilized. The process can be performed on signatures provided by the SG 120. It should be noted though that this inter-matching and clustering process is merely an example for the operation of the CP 130 and other inter-matching and/or clustering processes may be used for the purpose of the invention.

Following is a brief description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. Each cluster is represented by a small/compressed number of signatures, for example signatures generated by SG 12 as further explained hereinabove, which can be increased by variants. This results in a highly compressed representation of the content-universe. A connection graph between the multimedia data elements of a cluster may be stored. The graph can then be used to assist a user searching for data to move along the graph in the search of a desired multimedia data element.

In another embodiment, upon determination of a cluster, a signature for the whole cluster may be generated based on the signatures of the multimedia data elements that belong to the cluster. It should be appreciated that using a Bloom filter may be used to reach such signatures. Furthermore, as the signatures are correlated to some extent, the hash functions of the Bloom filter may be replaced by simpler pattern detectors, with the Bloom filter being the upper limit.

While signatures are used here as the basic data elements, it should be realized that other data elements may be clustered using the techniques discussed above. For example, if a system generating data items is used, the data items generated may be clustered according to the disclosed principles. Such data items may be, without limitation, multimedia data elements. The clustering process may be performed by dedicated hardware or by using a computing device having storage to store the data items generated by the system and then performing the process described herein above. Then, the clusters can be stored in memory for use as may be deemed necessary.

The CP 130 further uses an engine designed to reduce the number of signatures used in a structure, in a sense, extracting only the most meaningful signatures that identify the cluster uniquely. This can be done by testing a removal of a signature from a cluster and checking if the MMDEs associated with the cluster still are capable of being recognized by the cluster through signature matching.

The process of signature extraction is on-going as the DCC system 100 operates. It should be noted that after initialization, upon signature generation by the SG 120 of a MMDE, its respective signature is first checked against the clusters to see if there is a match. If a match is found, it may not be necessary to add the signature to the cluster or clusters, but rather to simply associate the MMDE with the identified cluster or clusters. However, in some cases where additional refinement of the concept structure is possible, the signature may be added, or at times it may even replace one or more of the existing signatures in the reduced cluster. If no match is found then the process of inter-matching and clustering may take place.

Figure 5:
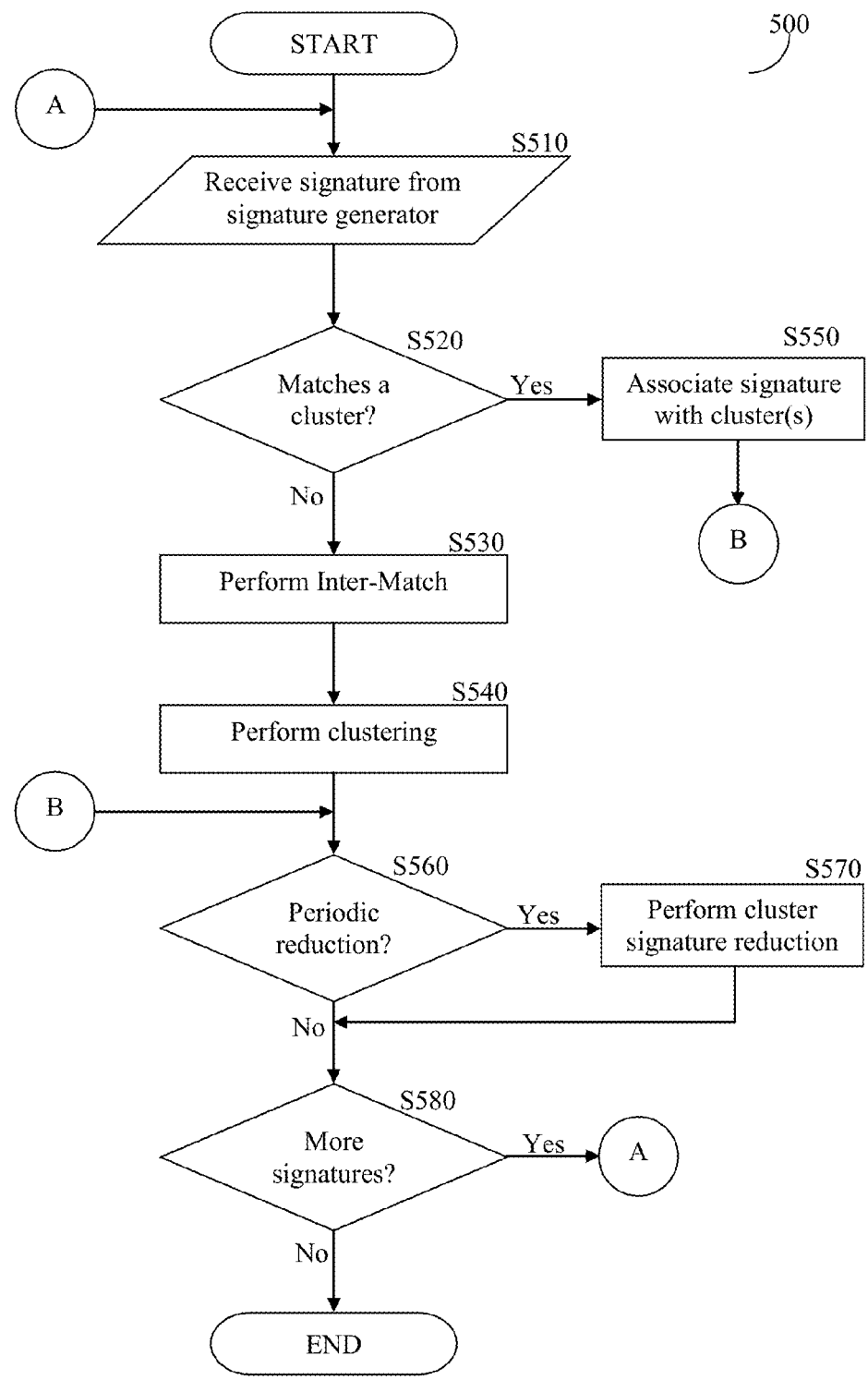
FIG. 5 is a flowchart illustrating the operation of the clustering processor of the DCC system.

FIG. 5 depicts an exemplary and non-limiting flowchart 500 of the operation of the CP 130. In S510 a signature of a MMDE is received, for example from the SG 120. In S520 it is checked whether the signature matches one or more existing clusters and if so execution continues with S550; otherwise, execution continues with S530. In S530 an inter-match between a plurality of signatures previously received by the DCC system 100 is performed, for example in accordance with the principles of the '489 Application. As may be necessary the DB 150 may be used to store results or intermediate results as the case may be, however, other memory elements may be used. In S540 a clustering process takes place, for example in accordance with the principles of the '489 Application. As may be necessary the DB 150 may be used to store results or intermediate results as the case may be, however, other memory elements may be used.

In S550, the signature identified to match one or more clusters is associated with the existing cluster(s). In S560 it is checked whether a periodic cluster reduction is to be performed, and if so execution continues with S570; otherwise, execution continues with S580. In S570 the cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed therefrom. The process of cluster reduction for the purpose of generating SRCs may be performed in parallel and independently of the process described herein above. In such a case after either S560 or S570 the operation of S580 takes place. In S580 it is checked whether there are additional signatures to be processed and if so execution continues with S510; otherwise, execution terminates. SRCs may be stored in memory, such as DB 150, for the purpose of being used by other elements comprising the DCC system 100.

The CG 140 performs two tasks, it associates metadata to the SRCs provided by the CP 130 and it associates between similar clusters based on commonality of metadata. Exemplary and non-limiting methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 Application"), and which is hereby incorporated for all that it contains. One embodiment of the '888 Application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 Application includes a system for collecting metadata for a first MMDE. The system comprises a plurality of computational cores enabled to receive the first MMDE, each core having properties to be statistically independent of each other core, each generates responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generates a respective first signature of said first MMDE and/or a second signature of said first MMDE, for the purpose of determining a match with at least a second MMDE stored in the storage and associating metadata associated with the at least second MMDE with the first MMDE.

Similar processes to match metadata with a MMDE or signatures thereof may be used. Accordingly, each SRC is associated with metadata which is the combination of the metadata associated with each of the signatures that is included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example 50% of the metadata match, they may be considered associated clusters that form a concept structure. Similarly, a second threshold level can be used to determine if there is an association between two SRCs where at least a number of signatures above the second threshold are identified as a match with another SRC. As a practical example one may want to consider the concept of Abraham Lincoln where images of the late President and features thereof, appear in a large variety of photographs, drawings, paintings, sculptures and more and are associated as a concept structure of the concept "Abraham Lincoln". Each concept structure may be then stored in memory, for example, the DB 150 for further use.

Figure 6:
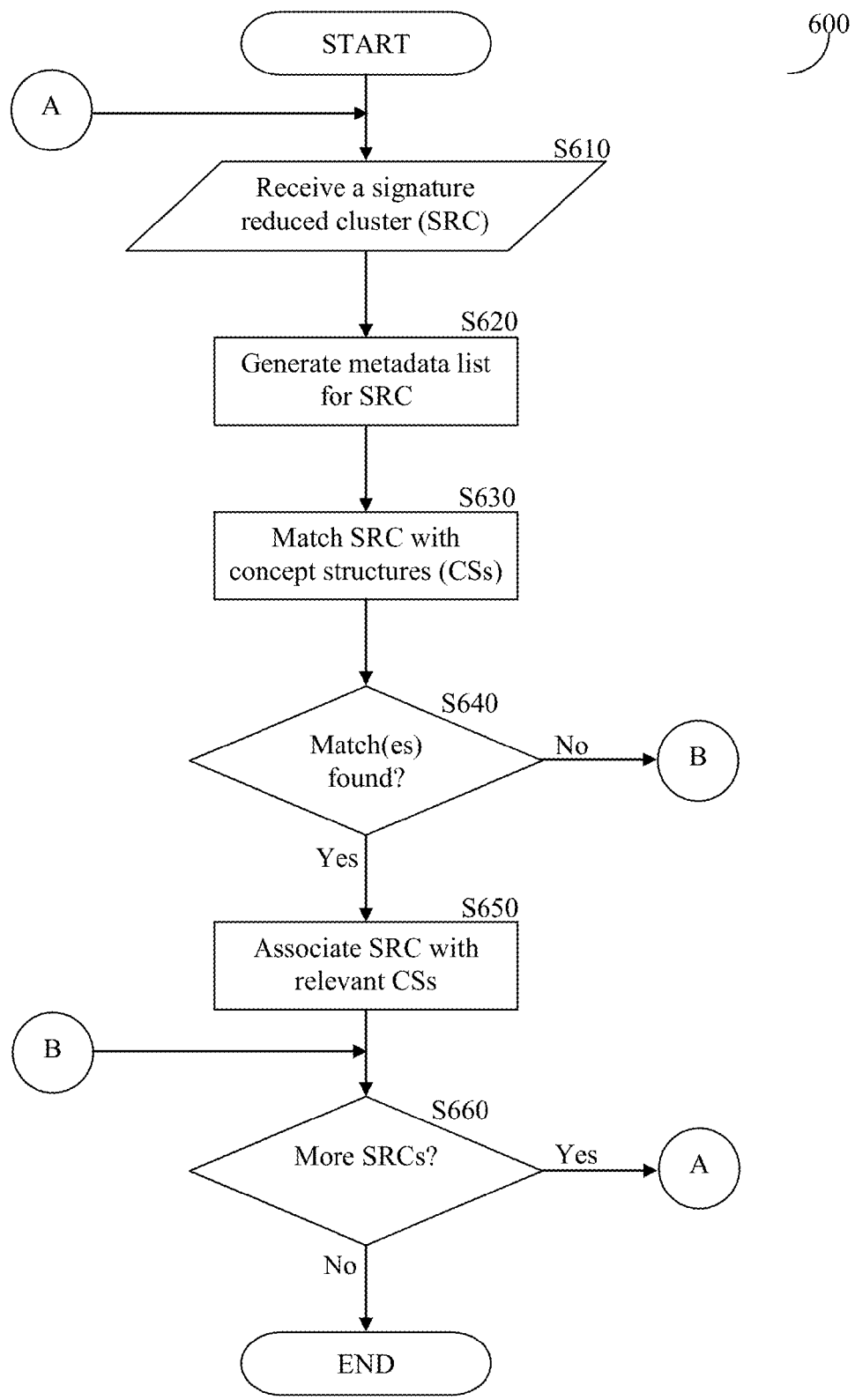
FIG. 6 is a flowchart illustrating the operation of the concept generator of the DCC system.

FIG. 6 shows an exemplary and non-limiting flowchart 600 of the operation of the CG 140. In S610 the CG 140 receives a SRC from either the CP 130 or by accessing memory, for example, the DB 150. In S620 metadata are generated for the signatures of the SRC, for example in accordance with the principles described hereinabove. A list of the metadata is created for the SRC preferably with no metadata duplication. In one embodiment the commonality of metadata is used to signify the strength of the metadata with respect to a signature and/or the SRC, i.e., a higher number of metadata repetitions is of more importance to the SRC than a lower number of repetitions. Furthermore, in one embodiment a threshold may be used to remove those metadata that have a significantly low rate of repetition as not being representative of the SRC.

In S630 the SRC is matched to previously generated SRCs to attempt to find various matches, as described for example, hereinabove in more detail. In S640, it is checked if at least one match was found and if so, execution continues with S650; otherwise, execution continues with S660. In S650 the SRC is associated with one or more of the concept structures to which the SRC has been shown to match. In S660 it is checked whether additional SRCs are to be received and if so execution continues with S610; otherwise, execution terminates.

A person skilled in the art would now appreciate the advantages of the DCC system 100 and methods thereof. The DCC system 100 is capable of creating automatically and in an unsupervised fashion concept structures of a wide variety of MMDEs. When checking a new MMDE it may be checked against the concept structures stored, for example, in the DB 150, and upon detection of a match provide the concept information about the MMDE. With the number of concept structures being significantly lower than the number of MMDEs the solution is cost effective and scalable for the purpose of identification of content of a MMDE.

According to various disclosed embodiments, the system and method are provided to verify an identity of a user accessing a user device. The disclosed system and method utilizes the DCC system 100 for the verification. The user identity is not authenticated or verified using any passcode, password or fingerprints, but rather by using a plurality of multimedia identification signals. In particular, a multimedia identification signal is a multimedia data element (MMDE) which may be, for example, an image, a video signal, an audio signal, a combination thereof, and so on. The multimedia identification signals may further include an audio gesture or a visual gesture as input by the user on the user device. A video gesture may be, for example, the user's lips dynamics or facial expressions, as well as surrounding parameters related to the user such as places, objects, and the like.

The multimedia identification signals are captured by or stored in the user device. In one embodiment, the DCC system 100 generates a set of signatures for such multimedia signals and a concept structure based on the set of signatures. When the user requests to access the device (e.g., unlock the device), signatures of the multimedia signals are re-generated and matched against the concept structure or previously generated signatures. If the signatures are matched, then the user is authenticated.

Figure 7:
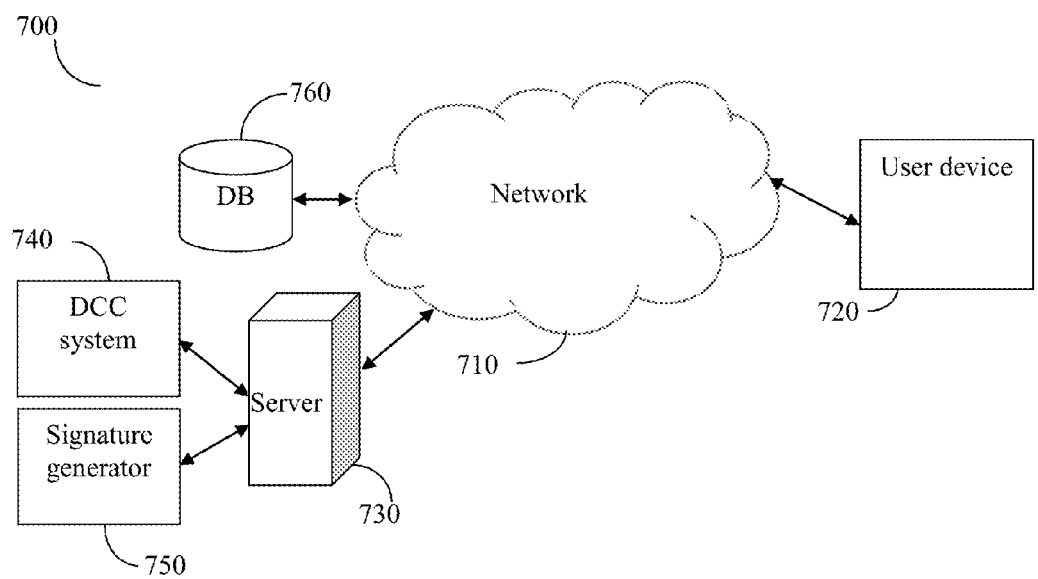
FIG. 7 is a diagram of a network system utilized to describe certain disclosed embodiments.

FIG. 7 shows an exemplary and non-limiting schematic diagram of a network system 700 utilized to describe the various disclosed embodiments. A network 710 is used as a means for communication between different elements of the network system 700. The network 710 may be the Internet, the world-wide-web (WWW), a local area network (LAN), a wide area network (WAN), a metro area network (MAN), and other networks capable of enabling communication between the elements of the network system 700.

Further communicatively connected to the network 710 is a user device 720. The user device 720 may be, for example, a personal computer (PC), a personal digital assistant (PDA), a mobile phone, a smart phone, a tablet computer, and other kinds of wired and mobile appliances, equipped with browsing, viewing, listening, filtering, and managing capabilities. In one embodiment, the user device 720 also includes one or more multimedia capturing units (not shown), such as a camera, a video camera, a microphone, a touch screen display, and the like. The capturing units of the device 720 are utilized to capture multimedia signals that serve as the multimedia identification signals. The user device 720 may also include a memory (not shown) utilized to maintain multimedia signals previously stored by the user. For example, pictures, video clips, audio clips, etc. taken by the user and previously captured by the user and stored in the user device's 720 memory.

Also connected to the network 710 is a server 730 configured to perform the process of verifying the user identity and configured to access the device 720. To this end, the server 730 is connected to a DCC system 740 and a signature generator 750. The DCC system 740 is configured and operates as the DCC system 100 discussed in detail above. The signature generator 750 is configured and operates as the SG 120. In certain configurations, the SG of the DCC system is utilized as the signature generator 750. The DCC system 740 and signature generator 750 may be connected through the server 730 to the network 710 or through a direct connection. In certain configurations, the DCC system 740 and signature generator 750 may be embedded in the server 730. It should be noted that the server 730 typically comprises a processing unit and a memory (not shown). The processor is coupled to the memory (not shown), which is configured to contain instructions that can be executed by the processing unit. The server 730 also includes a network interface (not shown) to the network 710.

The network system 700 also includes a database 760 which is configured to store the multimedia identification signals and signatures thereof required for the user authentication. In one embodiment, the database of the DCC system may serve as the database 760.

According to the embodiments disclosed herein, in order to allow access to the user device 720, a user of the device 720 is required to open an account in the server 730, for example, through a sign-in procedure. During this procedure a plurality of multimedia identification signals are sent from the user device 720 to the server 730. The user of the device 720 may capture such signals using one or the sensors of the device 720. Alternatively or collectively, the user of the device 720 may designate previous captured signals (e.g., pictures) stored in the user device's 720 memory.

The sign-in procedure may be initiated by an agent (e.g., a script) executed on the device 720 which provides the multimedia identification signals and sends these signals to the server 730. In another embodiment, the sign-in procedure may be executed by the server 730 which provides the instructions to the user on, e.g., a web-browser, or an application installed on the user device 720. In one embodiment, the additional parameters are sent to the server 730, such as an IP address of the computing device, time, date, a browser type, an operating system type, a user name, and so on. Such parameters may be required to register the user device 720 in the server 730. The received multimedia identification signals and parameters are saved in the user device.

For each of the received multimedia identification signals at least one signature is generated as discussed in detail above. The signatures are then stored in the database 760. According to one embodiment, the database 760 may further include a "black list" of signatures that are associated with malicious users or software. In one embodiment, a concept structure is generated using the signatures generated for the received multimedia identification signals, and the concept is associated with the user device. It should be noted that the user may from time to time send new multimedia identification signals to strengthen the security of the reliability of the authentication and reduce the number of false negative authentication attempts.

Once the sign-in procedure is completed, the user can access the device 720 after a successful completion of an identity verification process. For example, if the user device 720 is a smart phone, the verification process should be performed to unlock the phone. This process may be initiated by an agent (e.g., a script or an application installed or running on the device) or by the operating system of the user device 720.

In an embodiment, during the identity verification process, the server 730 receives multimedia identification signals corresponding to the signals provided during the sign-in procedure. For example, if a picture of the user's face is initially used, then the user is prompted to take a picture of his/her face, and such a picture is sent from the device 720 to the server 730. In one embodiment, only a sub-set of multimedia identification signals of the signals used for the sign up may be requested and used for the verification. The sub-set of multimedia identification signals may be randomly selected, thereby increasing the barrier to hack into the user device. For example, if 5 signals are used to generate the concept during the sign-in process, then only 2 signals may be required for verification. Each time the user requests an authentication, two different signals may be requested.

The server 730 is configured to verify the user identity of the user device 720 using the multimedia identification signals received from the device 720. With this aim, the received multimedia identification signals are processed and analyzed for the purpose of matching the sensory signal to concept structures generated and maintained by the DCC system 740. Such a match requires generating at least one signature for each of the received multimedia identification signals and matching the generated signature(s) against the concept structure created during the sign-in procedure and associated with the user device. The signature for the multimedia identification signals may be generated by means of the signature generator 750.

In one embodiment, the matching can be performed by providing a query to the DCC system 740 for finding a match between a concept structure respective of the user and the received multimedia identification signals or their respective signatures. The matching of multimedia identification signals to a concept structure includes matching signatures respective of each signal to the concept structure. Such matching results in matching sequences, each sequence is set with a threshold. Crossing of a threshold is considered as a match of the concept structure, thereby the user identity is verified and the user can access the device 720.

In another embodiment, signatures saved during the sign-in procedure are matched to signatures generated respective of the multimedia identification signals received during the verification process. The matching of the signatures is as discussed above in greater detail. If the signatures are determined to be matched, then the user identity is verified.

The verification of the user identity may allow the user, for example, to access the device 720 (e.g., unlock the device), access information stored in the device 720, make a payment using the device 720, access an application installed on the device 720, and/or for any purpose that requires user authentication.

Figure 8:
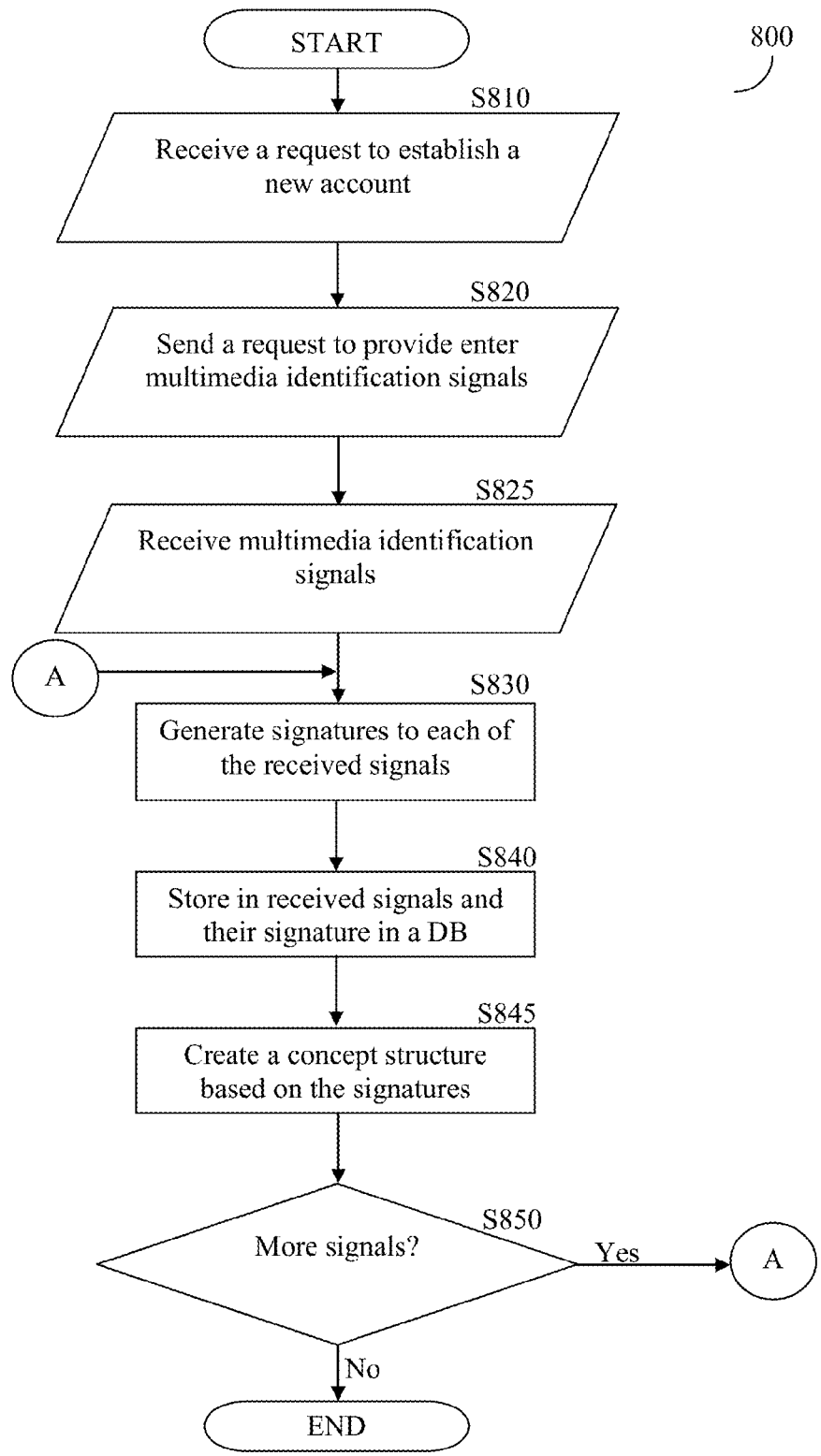
FIG. 8 is a flowchart illustrating a method for verifying user identification based on multimedia identification parameters (MMIDPs) according to one embodiment.

FIG. 8 shows an exemplary and non-limiting flowchart 800 illustrating the sign-in procedure according to an embodiment. In an embodiment the method is performed by the server 730. In S810, the operation starts when a request to establish a new account is received from a user device 720. According to one embodiment, S810 may be executed, for example, upon activation of a subscriber identity module (SIM) card on a device 720, activation of an agent or application installed on the device 720, or when a connection is established between the server 730 and the user device 720 for the first time.

In S820, a user of the user device is prompted to enter one or more multimedia identification signals. For example, the user is presented with a short sentence to repeat in order to avoid fraudulent recordings of the user's voice. The user may further be prompted to select from a set of pictures stored in the device, or to take a picture of surrounding objects. The multimedia identification signals can be captured by sensors of the device 720.

In S825, the multimedia identification signals captured by the sensors of the user device 720 are received. In S830, at least one signature is generated for each of the received multimedia identification signals. The generation of signatures respective of multimedia content is further discussed in FIGS. 3 and 4 hereinabove.

In S840, the received multimedia identification signals and their respective signatures are stored in a database. In S845, a concept structure is created using the signature. The metadata of the concept structure may include one or more identifiers of the device 720, for example, a user name, a device's IP address, a device type, an operating system of the device, and the like. Such details may be entered by a user of the user device 720. The generated concept structure and signatures are saved in a database for future verification of the user identification. The database may be the DB 760. In S850, it is checked whether additional multimedia identification signals are received, and if so execution continues with S830; otherwise, execution terminates.

As a non-limiting example, upon activation of a new user device, for example, the user device 720, a request to establish a new account is received. A visual parameter, for example a close up image of the user's eyes is captured by a camera of the user's device. In addition, the words "open sesame," are presented to the user and an audio input of the user repeating these words is captured by the microphone of the mobile device. One or more signatures are then generated by the signature generator respective of the visual and audio inputs. The signatures are stored in a database accessible by the server 730.

Figure 9:
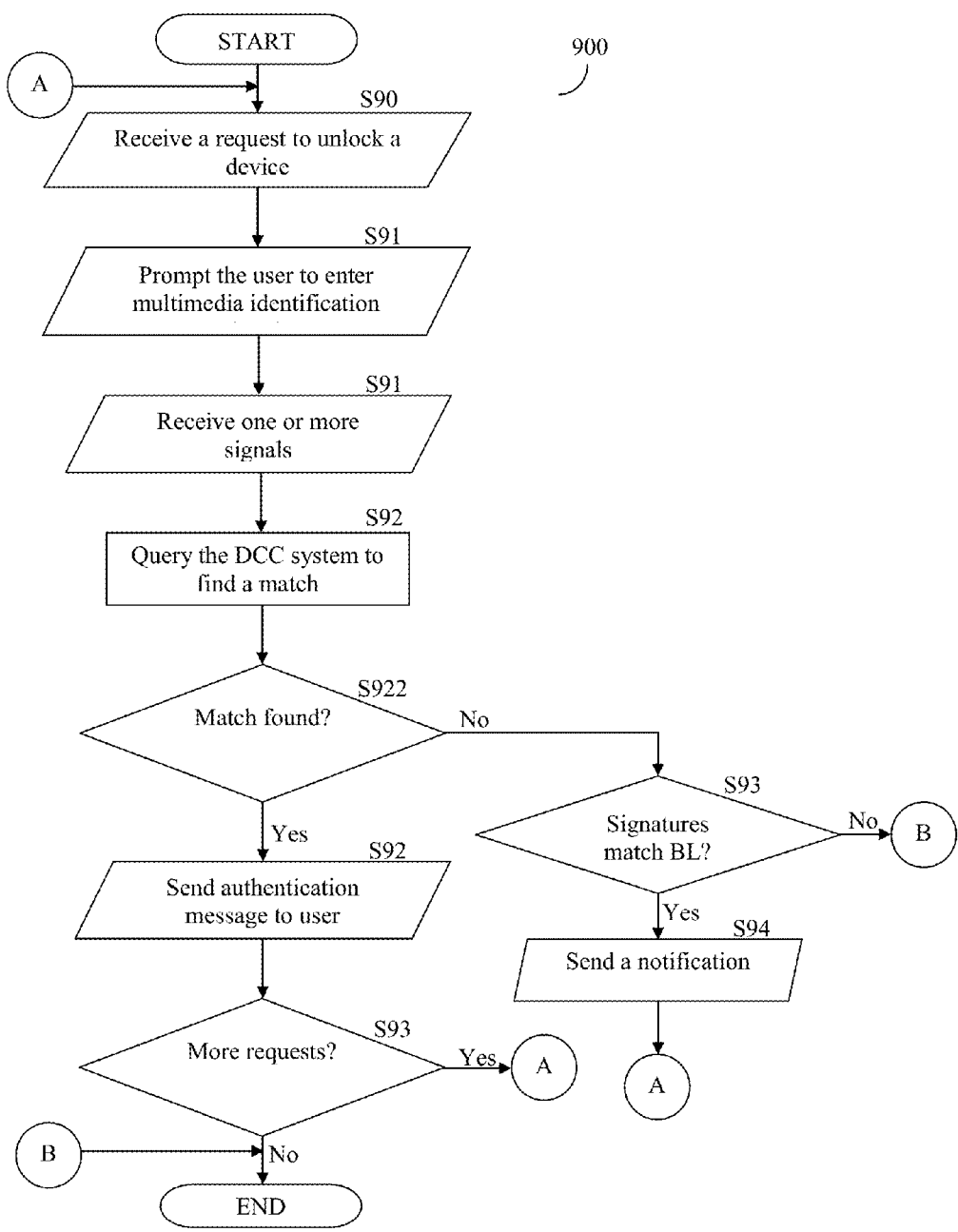
FIG. 9 is a flowchart illustrating a method for verifying the identification of the user according to an embodiment.

FIG. 9 shows an exemplary and non-limiting flowchart 900 illustrating a method for verifying a user identity according to one embodiment. In an embodiment the method is performed by the server 730.

In S905, a request to access the user device 720 is received. As noted above, the request may include unlocking the device 720, accessing information stored in the device 720, making a payment using the device 720, accessing an application installed on the device 720, and/or for any purpose that requires the user authentication.

In S910, the user is prompted to enter a plurality of multimedia identification signals corresponding to the multimedia identification signals used during the sign-in procedure. In S915, the multimedia identification signals captured by the sensors of the user device 720 are received. As noted above, the multimedia identification signals provided in S910 may be only a sub-set of the multimedia identification signals previously sent to the server 130. In S915, one or more signatures are generated respective of the one or more multimedia identification signals.

In S920, the DCC system (e.g., system 740) is queried to find a match between the concept structure (CS) and the received multimedia identification signals or their respective signatures. Alternatively, in S920 it is checked whether signatures generated for the received multimedia identification signals match the signatures stored in the database for the user of the device 720. Various embodiments for matching between signatures or between multimedia identification signals to a concept structure are discussed in detail above.

In S922, it is checked if such a match is found, and if so, execution continues with S925; otherwise, execution continues with S935. In S925, a message is sent to the user device 720 that the user is authenticated to access the device 720.

In S930, it is checked whether additional identity verification requests are received, and if so execution returns to S910; otherwise, execution terminates. It should be noted that in case the user identity is verified, the multimedia identification signals received at S910 and related to the user can be utilized to update the concept structure generated respective of the user device in S845, thus allowing identification of changes in the inputs such as, a haircut, plastic surgery, voice changes, and so on of the user.

In one embodiment, in order to reduce the number of false negative notifications, it is checked whether the signatures of the multimedia identification signals match one of the black-listed signatures stored in the database (S935). If so, execution continues with S940, where a message is sent to the device to block the access; otherwise, execution returns to S910 where the user is prompted again to enter new multimedia identification signals in order to re-perform the verification process. It should be noted that after a pre-defined number of failed verification attempts any access to the device 720 is blocked.

According to one embodiment, signatures generated for multimedia identification signals that did not pass the verification process are added to the black list of signatures and saved in the database.

The embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the several embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for verifying an identity of a user accessing a user device, comprising:

receiving a request to verify the identity of the user accessing the user device;

receiving a current set of multimedia identification signals from the user device in accordance with the verification request;

querying a deep-content-classification (DCC) system to find a match between at least one pre-stored concept structure associated with the user to be verified and the current set of received multimedia identification signals, wherein the at least one concept structure is created during a sign-in procedure and is based on a grouping of associated clusters, wherein each cluster includes a compressed set of similar signatures generated from an initial set of previously received multimedia identification signals received during the sign-in procedure; and sending an authentication notification to the user upon finding a match between the at least one concept structure and the current set of received multimedia identification signals.

2. The method of claim 1, further comprising:
generating at least one signature to each of the initial set of multimedia identification signals prior to querying the DCC system.

3. The method of claim 1, wherein each of the initial set of multimedia identification signals is at least one of: an image, a graphic, a video stream, a video clip, an audio stream, an audio clip, a video frame, a photograph, and images of signals.

4. The method of claim 3, wherein the images of signals are at least one of: medical signals, geophysical signals, subsonic signals, supersonic signals, electromagnetic signals, infrared signals, an audio signal, a video signal, coordinates, and a sonography signal.

5. The method of claim 1, wherein each of the current set of multimedia identification signals received from the user device is at least one of: captured by the user device, and stored in the user device.

6. The method of claim 1, wherein the request to verify the user identity accessing the user device further includes supplemental information, wherein the supplemental information comprises at least one of an Internet Protocol (IP) address of the user computing device, a time, a date, and a browser type of the user computing device.

7. The method of claim 6, wherein the supplemental information is used to create metadata from the at least one concept structure.

8. The method of claim 7, wherein the sign-in procedure further comprises:
receiving the initial set of multimedia identification signals from the user device;
generating at least one signature for each multimedia identification signal in the initial set of multimedia identification signals received from the user device;
creating the at least one concept structure associated with the user using the at least one generated signature;
associating the metadata with the created at least one concept structure; and
saving the created at least one concept structure in a database.

9. The method of claim 7, wherein the current set of received multimedia identification signals corresponds to the initial set of multimedia identification signals.

10. The method of claim 8, wherein the matching between the at least one concept structure and the current set of received multimedia identification signals further includes:
matching signatures in the at least one concept structure to signatures of the initial set of received multimedia identification signals.

11. The method of claim 8, wherein the at least one concept structure is created using the DCC system, wherein the DCC system includes:

an attention processor configured to generate a plurality of items from a multimedia identification signal and to determine which of the generated items are of interest for signature generation;
a signature generator configured to generate at least one signature responsive to at least one item of interest; and
a concept generator configured to match between the at least one signature generated responsive to at least one of the items of interest and a set of signature reduced clusters associated with a plurality of cluster structures.

12. A non-transitory computer readable medium having stored thereon instructions for causing one or more processing units to execute the method according to claim 1.

13. The method of claim 1, wherein each signature is generated by a signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core.

14. A server for verifying an identity of a user accessing a user device, comprising:
an interface to a network for receiving a request to verify the identity of the user accessing the user device and for receiving a current set of multimedia identification signals from the user device;
a processor; and
a memory connected to the processor, the memory contains instructions that, when executed by the processor, configure the server to:
query a deep-content-classification (DCC) system to find a match between at least one concept structure associated with the user and a current set of multimedia identification signals, wherein the concept structure is created during a sign-in procedure and is based on a grouping of associated clusters, where each cluster includes a compressed set of similar signatures generated from an initial set of multimedia identification signals received during the sign-in procedure; and
send an authentication notification upon finding a match between the at least one concept structure and the current set of received multimedia identification signals.

15. The server of claim 14, wherein the server is further configured to:
generate at least one signature to each of the initial set of multimedia identification signals prior to querying of the DCC system.

16. The server of claim 14, wherein each of the initial set of multimedia identification signals is at least one of: an image, a graphic, a video stream, a video clip, an audio stream, an audio clip, a video frame, a photograph, and images of signals.

17. The server of claim 14, wherein the initial set of multimedia identification signals is at least one of: captured by the user device, and stored in the user device.

18. The server of claim 14, wherein the request further includes supplemental information, wherein the supplemental information comprises at least one of an Internet protocol (IP) address of the user computing device, a time, a date, and a browser type of the IP address of the user computing device, wherein the supplemental information is used to create a metadata of the concept structure.

19. The server of claim 18, wherein the server is further configured to:

receive an initial set of multimedia identification signals from the user device;

generate at least one signature for each signal in the initial set of multimedia identification signals;

create the at least one concept structure associated with the user based on the generated signatures;

associate the metadata with the created at least one concept structure; and save the created concept structure in a database.

20. The server of claim 19, wherein the current set of received multimedia identification signals correspond to the initial set of multimedia identification signals, wherein further the current set of received multimedia identification signals is a subset of the initial set of multimedia identification signals.

21. The server of claim 19, wherein the DCC system is further configured to match signatures in the at least one concept structure to signatures of the received set of current multimedia identification signals.

22. The server of claim 19, wherein the at least one concept structure is created using the DCC system, wherein the DCC system includes:

an attention processor configured to generate a current set of items from a multimedia identification signal and to determine which of the generated items are of interest for signature generation;

a signature generator configured to generate at least one signature responsive to at least one item of interest; and a concept generator configured to match between the at least one signature generated responsive to at least one of the items of interest and a current set of signature reduced clusters associated with a current set of cluster structures.

23. The server of claim 14, wherein the DCC system is integrated in the server.

* * * * *